(12) United States Patent
Escowitz et al.

(10) Patent No.: US 11,584,049 B2
(45) Date of Patent: Feb. 21, 2023

(54) STRUCTURAL FOAM MOLDING METHOD USING CONTINUOUS FIBER COMPOSITES, AND PARTS FORMED THEREFROM

(71) Applicant: Arris Composites Inc., Berkeley, CA (US)

(72) Inventors: Ethan Escowitz, Berkeley, CA (US); Riley Reese, Oakland, CA (US); J. Scott Perkins, Oakland, CA (US)

(73) Assignee: Arris Composites Inc., Berkeley, CA (US)

( * ) Notice: Subject to any disclaimer, the term of this patent is extended or adjusted under 35 U.S.C. 154(b) by 63 days.

(21) Appl. No.: 16/983,931

(22) Filed: Aug. 3, 2020

(65) Prior Publication Data

US 2021/0031415 A1 Feb. 4, 2021

Related U.S. Application Data

(60) Provisional application No. 62/882,080, filed on Aug. 2, 2019.

(51) Int. Cl.
*B29C 44/12* (2006.01)
*B29C 45/03* (2006.01)
*B29C 45/00* (2006.01)

(52) U.S. Cl.
CPC ........ *B29C 44/128* (2013.01); *B29C 45/0001* (2013.01); *B29C 45/0005* (2013.01);
(Continued)

(58) Field of Classification Search
CPC ................ B29C 45/03; B29C 45/0001; B29C 45/0005; B29C 2045/0089; B29C 2045/0006; B29C 2045/0012; B29C 45/14631; B29C 45/14786; B29C 45/14803; B29C 2045/1723; B29C 65/3636; B29C 65/364; B29C 66/721; B29C 66/72141; B29C 70/06; B29C 70/081; B29C 70/083; B29C 70/086; B29C 70/10; B29C 70/12; B29C 70/16; B29C 45/14795; B29C 51/145; B29C 59/025; B29C 61/0658; B29C 66/729;
(Continued)

(56) References Cited

U.S. PATENT DOCUMENTS

| 4,268,571 A * | 5/1981 | McCarthy .......... B29D 99/0025 428/307.3 |
| 2013/0149521 A1 * | 6/2013 | Nelson .................. B29C 70/525 428/221 |

(Continued)

FOREIGN PATENT DOCUMENTS

JP 2000159913 * 11/1998

*Primary Examiner* — Stella K Yi
(74) *Attorney, Agent, or Firm* — Kaplan Breyer Schwarz, LLP

(57) ABSTRACT

A method for making structural foam parts having continuous aligned fibers includes placing an assemblage of fiber-bundle-based preforms in an injection mold, creating a melt flow of resin and, optionally, short, loose fiber, and adding foaming agent to the melt flow. When the foaming agent/melt flow mixture is introduced into the injection mold, the foaming agent foams. The assemblage is structured and positioned so that fibers therefrom adopt a desired alignment and position in the final part. Structural foam fills the remainder of the volume of the part.

17 Claims, 7 Drawing Sheets

(52) U.S. Cl.
CPC ...... *B29C 45/03* (2013.01); *B29C 2045/0006* (2013.01); *B29C 2045/0089* (2013.01)

(58) Field of Classification Search
CPC ..... B29C 70/02; B29C 70/021; B29C 70/026; B29C 70/08; B29C 70/543
See application file for complete search history.

(56) References Cited

U.S. PATENT DOCUMENTS

2018/0237605 A1\* 8/2018 Chang ...................... C08J 9/236
2020/0114596 A1  4/2020 Davidson et al.

\* cited by examiner

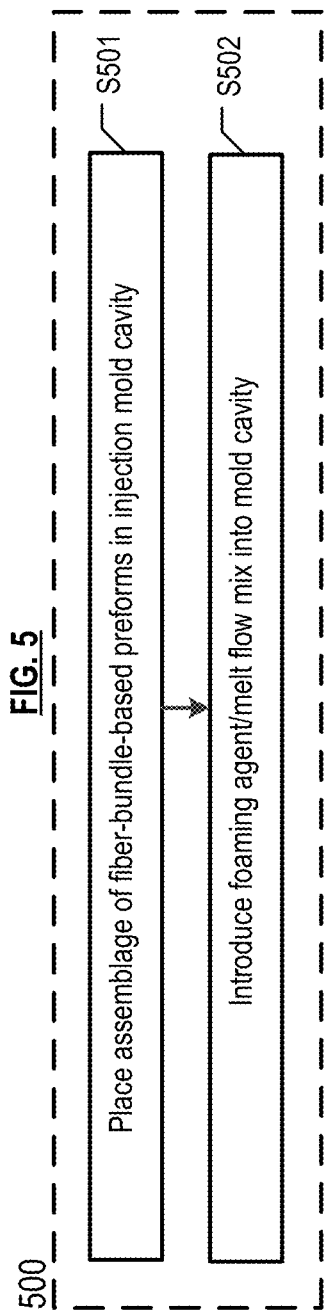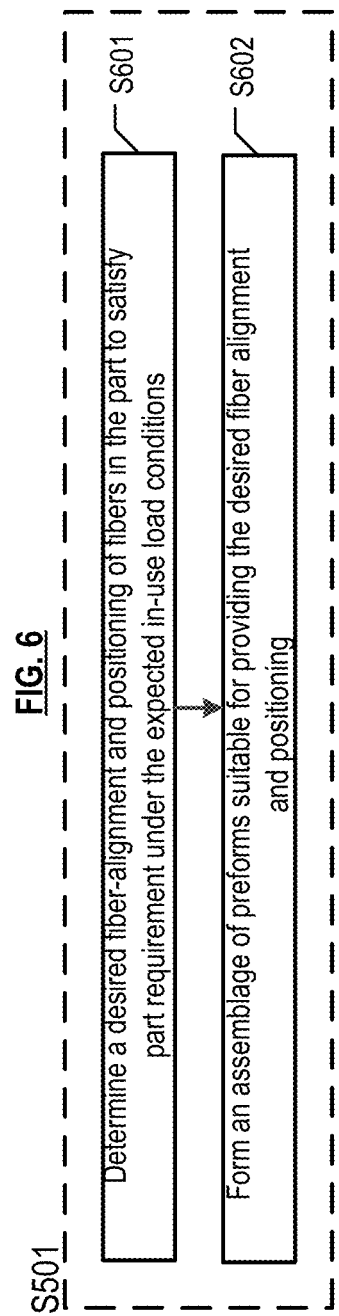

STRUCTURAL FOAM MOLDING METHOD USING CONTINUOUS FIBER COMPOSITES, AND PARTS FORMED THEREFROM

STATEMENT OF RELATED CASES

This case claims priority to U.S. patent application Ser. 62/882,080, filed Aug. 2, 2019 and which is incorporated herein by reference.

FIELD OF THE INVENTION

The present invention pertains to structural foam molding.

BACKGROUND OF THE INVENTION

Composite Injection Molding (CIM) is a well-known process that involves melting a composite precursor, and using high pressure to inject the melted material into a mold cavity. The mold is initially entirely empty, and the volume of the injected precursor is appropriately specified to fill the empty mold. The precursor consists of polymer matrix and fibers of limited length (c.a., <25 mm), and the injection process results in randomized fiber orientations in the final part. A required injection pressure is typically supplied by an auger screw, which imparts significant shear to the melted material (i.e., "melt flow") as it passes through a nozzle into the mold cavity. This shear, and the diameter of the injection nozzle, limit the allowable fiber length. Specifically, fibers greater than 25 mm would break or clog the nozzle. CIM can produce relatively complex parts, but strength and stiffness are limited due to the short fibers and lack of control over fiber orientations with the final part.

Structural Foam Molding (SFM) is similar to CIM in that a melted composite (or neat resin) precursor is injected into an empty mold cavity at high pressure (although at considerably lower pressure than CIM). The critical difference from CIM is that for SFM, in addition to injecting the composite melt, a foaming agent is also introduced and diffused into the melt flow, typically before the flow exits the nozzle but after the precursor is melted.

The foaming agent is typically inert, such as nitrogen or carbon dioxide, and is mixed and diffused into the melt flow in a liquid or gaseous state. The required volume of composite precursor is reduced compared to the same CIM process due to the extra volume of foaming agent. Flow exiting the nozzle and entering the mold cavity undergoes rapid expansion due to a significant pressure drop across the nozzle outlet. If the foaming agent is initially in a liquid state, this expansion involves a phase change to a gaseous state. Whether the foaming agent is provided as a liquid or a gas, the result is 'bubbles' of gas within the mold cavity. The bubbles create a porous structure (i.e., foam) amidst the melt flow within the interior of the mold cavity during the injection process. Any bubbles that reach the mold surface "pop" as surface tension breaks due to contact, leaving a 'skin' on the surface of the final part, while the core is a porous foam structure.

Relative to CIM, equivalent parts produced through SFM exhibit a lower density due to a porous foam core, and thus typically possess higher specific strength and stiffness. On an absolute rather than per unit mass basis, however, they are generally less strong and stiff due to the lesser integrity of the foam compared to solid material. Similar to CIM, fibers within SFM parts are also limited in length and have a randomized orientation.

Although there are differences in the parts produced by CIM and SFM, these processes have several shared limitations or drawbacks. In particular, both of these processes require the use of relatively short fibers (c.a., <25 mm), which significantly limits the type of parts that they can make. In particular, these processes are generally not suitable for structural parts with high stress loading conditions, as the fibers are too short to distribute stress throughout the matrix. Despite its name, the 'structural' description of SFM is used to designate the load-bearing aspect of the foam core, rather than the nature of the end use of the part being produced by the process. (For example, the foam core can withstand stress unlike soap foam.)

A further limitation of both of these processes is that they are constrained to random fiber orientations. The injection process is a turbulent fluid dynamic, in which fibers align to the complex flow vectors therein. As the fluidic filling of the mold cavity varies during every repetition of the process, fiber orientation cannot be controlled.

Beyond SFM, structural foam is employed in applications of structural foam-core sandwich panels. Such applications involve a method of using typical laminate-ply constituents adhered to a structural foam sheet that is supplied by an upstream process. Laminate plies can be unidirectional, bi/tri-directional, woven, etc. The plies are adhered to foam core via thermoset adhesive sheets rather than by bonding of the matrix (i.e., resin) materials. Relative to CIM and SFM, structural foam-core panels are limited in geometric design latitude. Neither the foam core nor the laminate plies are very compliant, so the panels are relatively flat in shape.

In an area of related art, overmolding processes have been employed to integrate wires, fibers, and cloths/weaves into tires and timing belts. Such overmolded wires and fibers give timing belts and tires improved strength, stiffness, and toughness along their major axes. In existing applications, these wires and fibers are bare, and are not pre-impregnated with a matrix material. As such, the material into which they are overmolded is, in fact, their matrix material. Given the non-structural nature of tires and timing belts, such applications do not lend themselves to SFM.

While SFM addresses some problems of CIM (mainly density and mass specific properties), it does not address the inability of parts produced by the process to withstand high stress. The short, randomized fibers in both CIM and SFM limit the type of parts produced by the process. High-strength structural components are generally not suitable for CIM or SFM. Structural foam-core sandwich panels are capable of integrating a structural foam core between layers of aligned composites laminates, but are severely limited in geometric complexity. Furthermore, integration of the composite laminate plies to the foam core is accomplished through adhesives, which is relatively less robust than matrix (resin) bonding.

SUMMARY

The present invention addresses the design limitations of CIM and SFM by providing a process in which continuous and aligned fibers are incorporated into an SFM process.

All composite precursor material that is injected through existing CIM and SFM processes travels through an injection nozzle, thereby subjecting the composite precursor to high shear forces and turbulent fluid dynamics. In accordance with the illustrative embodiment, one or more assemblages of appropriately shaped fiber-bundle-based preforms are placed in an injection mold cavity prior to the injection of a foam/composite mix. To geometrically maximize strength and stiffness of a part, as desired, the assemblages of preforms can be designed to:
  a) occupy regions of the mold cavity along its surface; and/or
  b) occupy internal regions of the mold cavity; and/or
  c) initially occupy internal regions and subsequently be carried by the melt flow to interface with outer regions.

The one or more assemblages of fiber-bundle-based preforms that are placed into the mold cavity consist of fibers that are both aligned and continuous. More particularly, in some embodiments, each preform in the assemblage(s) includes aligned and continuous fibers, and the preforms themselves are aligned with one another. Such continuity and alignment are largely preserved through the subsequent injection process, because the prevailing injection pressures for SFM (c.a. 200 to 600 psi) are significantly less than CIM (c.a. 3,000 to 16,000 psi). Additionally, the assemblage of preforms is configured so that it can register itself to the mold (e.g., the walls of the mold cavity, internal features within the mold cavity, etc.). The resultant part demonstrates aligned and continuous fibers where desired within a part by virtue, in some embodiments, of the original placement of the assemblage(s) of preforms in the mold cavity. Structural foam occupies the remaining regions within the internal core of the part, and, importantly, bonds to the assemblage(s) of preforms through co-melting of like resins.

Embodiments of the invention enable hitherto unachievable fiber lengths and patterns in foam-molded parts, relative to CIM and SFM. This potentially results in substantially stronger and stiffer parts than have been previously produced via SFM. Existing SFM processes do not place any precursor material into the mold cavity prior to injection, since, among any other reasons, the injection process itself enables rapid cycle times, which is generally considered to be an advantage of the process.

As indicated above, and in accordance with the invention, the assemblage(s) of preforms that are placed in the mold are not simply overmolded via the foam/composite melt flow, but rather co-melted therewith, the resins from each such source thereby producing a coherent matrix, which once again results in a stronger part than would otherwise be the case.

Embodiments of the invention thus accept a small degree of process inefficiency (i.e., placement of material into a mold prior to injection) for potentially substantially improved part performance.

In some embodiments, a method for forming a part in accordance with the present teachings comprises: placing an assemblage of fiber-bundle-based preforms in a mold cavity; forming a melt flow, wherein the melt flow includes: (a) melted resin and loose fiber, or (b) melted resin without fiber; forming a mixture by adding a foaming agent to the melt flow; and delivering the mixture of melt flow and foaming agent to the mold cavity, wherein pressure is lower in the mold cavity than under the conditions in which the foaming agent is added to the melt flow, thereby causing the foaming agent to foam in the melt flow.

In some embodiments, a method for forming a part in accordance with the present teachings comprises: placing a preform charge in a mold cavity, the preform charge comprising a plurality of fiber-bundle-based preforms; forming a slurry of loose fiber and resin, or resin without fiber; melting the resin; adding a foaming agent to melted resin; and delivering a mixture of the foaming agent, the melted resin, and fibers, if present, to the mold cavity.

In some embodiments, a structural foam part in accordance with the present invention comprises: a plurality of aligned, continuous fibers disposed proximal to a surface of at least one side of the structural foam part; porous structural foam disposed in an internal volumetric region of the structural foam part; and a coherent polymer matrix comprising: (i) a first polymer associated with preforms, which preforms are the source of the aligned, continuous fibers, and (ii) a second polymer associated with a composite feed, which does not include aligned, continuous fibers.

BRIEF DESCRIPTION OF THE DRAWINGS

FIG. 5 depicts a method in accordance with the illustrative embodiment.

FIG. 6 depicts suboperations for performing one of the operations of the method of FIG. 5.

DETAILED DESCRIPTION

Figure 1:
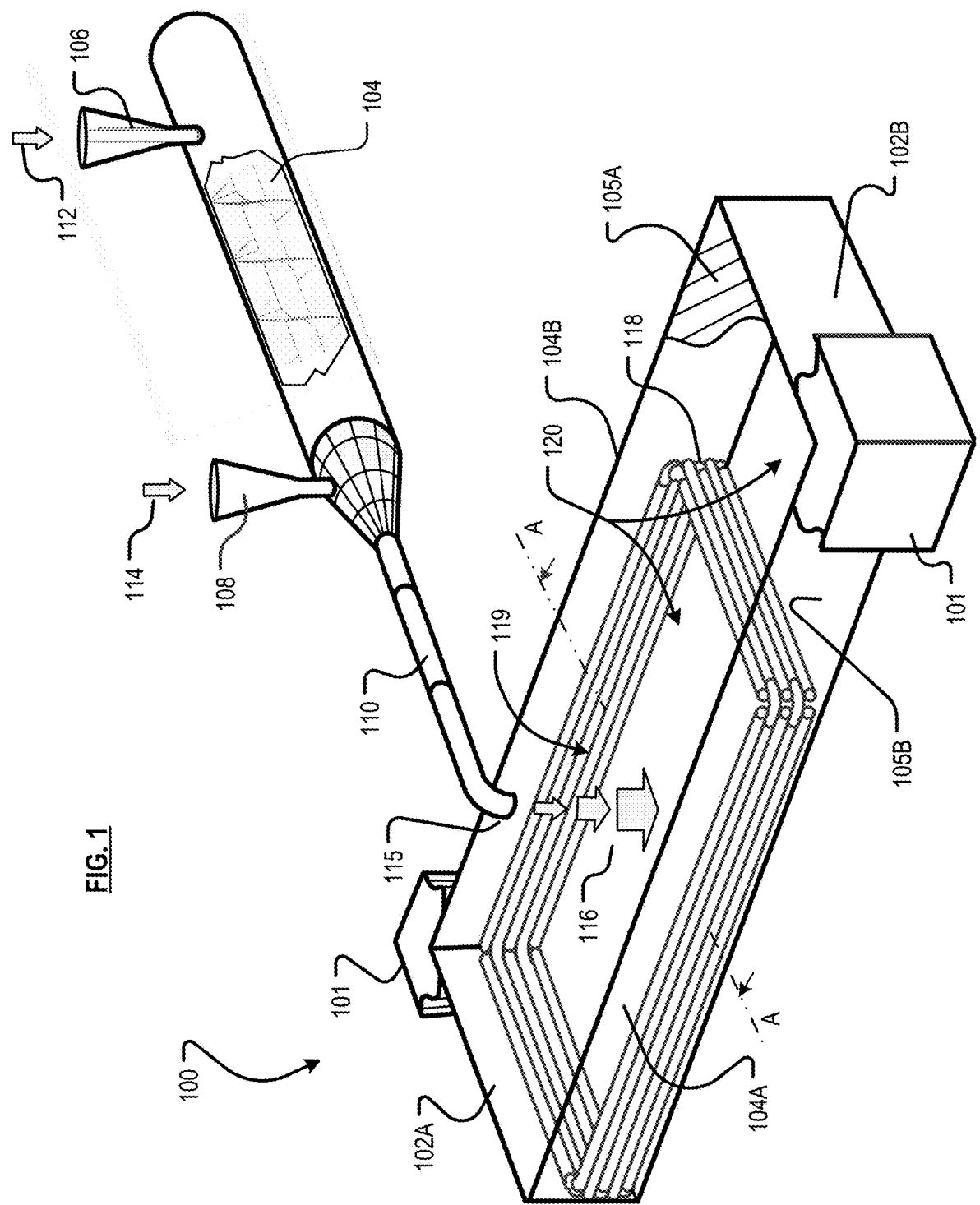
FIG. 1 depicts a process schematic of a method in accordance with the present teachings.

The following terms, and their inflected forms, are defined for use in this disclosure and the appended claims as follows:

"Fiber" means an individual strand of material. A fiber has a length that is much greater than its diameter. For use herein, fibers are classified as (i) continuous or (ii) short. "Continuous fibers" have a length that is no less than about 60 percent of the length of a mold feature or part feature where they will ultimately reside. Hence, the descriptor "continuous" pertains to the relationship between the length of a fiber and a length of a region in a mold or part in which the fiber is to be sited. For example, if the long axis of a mold has a length of 100 millimeters, fibers have a length of about 60 millimeters or more would be considered "continuous fibers" for that mold. A fiber having a length of 20 millimeters, if intended to reside along the same long axis of the mold, would not be "continuous." Such fibers are referred to herein as "short fibers." The term "short fiber," as used herein, is distinct from the "chopped fiber" or "cut fiber," as those terms are typically used in the art. In the context of the present disclosure, short fibers are present in a preform (of the same length), and substantially all short fibers in the preform are unidirectionally aligned. As such, the short fibers will have a defined orientation in the preform layup or preform charge in the mold and in the final part. As used in the art, "chopped" or "cut" fiber has a random orientation in a mold and the final part. Returning to the example of the 20-millimeter fiber, it is notable that if that fiber is intended for a feature in the mold having a length of about 20 millimeters, then the fiber would be considered to be "continuous." For features that are smaller than the overall size of the mold, the fibers will typically be somewhat longer than the feature, to enable "overlap" with other fibers. For a small feature, the overlap amount could represent the major portion of the length of the fiber.

"Fiber bundle" means plural (typically multiples of one thousand) unidirectionally aligned fibers.

"Compatible" means, when used to refer to two different resin materials, that the two resins will mix and bond with one another.

"Stiffness" means resistance to bending, as measured by Young's modulus.

"Tensile strength" means the maximum stress that a material can withstand while it is being stretched/pulled before "necking" or otherwise failing (in the case of brittle materials).

"Tow" means a bundle of unidirectional fibers, ("fiber bundle" and "tow" are used interchangeably herein unless otherwise specified). Tows are typically available with fibers numbering in the thousands: a 1K tow, 4K tow, 8K tow, etc.

"Prepreg" means fibers, in any form (e.g., tow, woven fabric, tape, etc.), which are impregnated with resin.

"Towpreg" or "Prepreg Tow" means a fiber bundle (i.e., a tow) that is impregnated with resin.

"Preform" means a segment of plural, unidirectionally aligned fibers. The segment is cut to a specific length, and, in many cases, will be shaped (e.g., bent, twisted, etc.) to a specific form, as appropriate for the specific part being molded. Preforms are usually sourced from towpreg (i.e., the tow-preg is sectioned to a desired length), but can also be from another source of plural unidirectionally aligned fibers (e.g., from a resin impregnation process, etc.). The cross section of the preform, and the fiber bundle from which it is sourced typically has an aspect ratio (width-to-thickness) of between about 0.25 to about 6. Nearly all fibers in a given preform have the same length (i.e., the length of the preform) and, as previously noted, are unidirectionally aligned. The modifier "fiber-bundle-based" is often pre-pended, herein, to the word "preform" to emphasize the nature of applicant's preforms and to distinguish them from prior-art preforms, which are typically in the form of segments of tape or in the form of a shape cut from sheets of fiber. Applicant's use of the term "preform" explicitly excludes any size of shaped pieces of: (i) tape (typically having an aspect ratio—cross section, as above—of between about 10 to about 30), (ii) sheets of fiber, and (iii) laminates. Regardless of their ultimate shape/configuration, these prior-art versions of preforms do not provide an ability to control fiber alignment in a part in the manner of applicant's fiber-bundle-based preforms.

"Consolidation" means, in the molding/forming arts, that in a grouping of fibers/resin, void space is removed to the extent possible and as is acceptable for a final part. This usually requires significantly elevated pressure, either through the use of gas pressurization (or vacuum), or the mechanical application of force (e.g., rollers, etc.), and elevated temperature (to soften/melt the resin).

"Partial consolidation" means, in the molding/forming arts, that in a grouping of fibers/resin, void space is not removed to the extent required for a final part. As an approximation, one to two orders of magnitude more pressure is required for full consolidation versus partial consolidation. As a further very rough generalization, to consolidate fiber composite material to about 80 percent of full consolidation requires only 20 percent of the pressure required to obtain full consolidation.

"Preform Charge" means an assemblage of (fiber-bundle-based) preforms that are at least loosely bound together ("tacked") so as to maintain their position relative to one another. Preform charges can contain a minor amount of fiber in form factors other than fiber bundles, and can contain various inserts, passive or active. As compared to a final part, in which fibers/resin are fully consolidated, in a preform charge, the preforms are only partially consolidated (lacking sufficient pressure and possibly even sufficient temperature for full consolidation). By way of example, whereas a compression-molding process is typically conducted at about 150-1000 psi (which will typically be the destination for a preform-charge in accordance with the present teachings), the downward pressure applied to the preforms to create a preform charge in accordance with the present teachings is typically in the range of about 10 psi to about 100 psi. Thus, voids remain in a preform charge, and, as such, the preform charge cannot be used as a finished part.

"Planar" means having a two-dimensional characteristic. The term "planar" is explicitly intended to include a curved planar surface. For example, the "sheet" portion of the rib-and-sheet part, which is considered to be planar, can be curved or flat.

"About" or "Substantially" means +/−20% with respect to a stated figure or nominal value.

Other than in the examples, or where otherwise indicated, all numbers expressing, for example, quantities of ingredients used in the specification and in the claims are to be understood as being modified in all instances by the term "about." Accordingly, unless indicated to the contrary, the numerical parameters set forth in the following specification and attached claims are understood to be approximations that may vary depending upon the desired properties to be obtained in ways that will be understood by those skilled in the art. Generally, this means a variation of at least +/−20%.

Also, it should be understood that any numerical range recited herein is intended to include all sub-ranges encompassed therein. For example, a range of "1 to 10" is intended to include all sub-ranges between (and including) the recited minimum value of about 1 and the recited maximum value of about 10, that is, having a minimum value equal to or greater than about 1 and a maximum value of equal to or less than about 10.

Embodiments of the invention improve on existing structural foam molding (SFM) processes, such as by providing parts that are stronger and stiffer than parts produced via conventional SFM processes. In accordance with the illustrative embodiment, one or more assemblages of appropriately shaped fiber-bundle-based preforms are placed in the injection mold prior to the injection of a foam/composite mix.

The assemblage(s) of preforms that are placed into the mold cavity consist of fibers that are both aligned and continuous. More particularly, in some embodiments, each preform in the assemblage includes aligned and continuous fibers, and the preforms in the assemblage are aligned with one another. Such continuity and alignment are largely preserved through the subsequent injection process, because the prevailing injection pressures for SFM are significantly less than for CIM. Moreover, in some embodiments, the assemblage(s) are registered to the cavity walls of the mold, or to features within the mold, which also helps to preserve fiber alignment and location. The resultant parts thus demonstrate aligned and continuous fibers where desired. Structural foam occupies the remaining regions within the internal core of the part, and bonds to the assemblage(s) of preform through co-melting of like resins.

By virtue of the use of assemblage(s) of preforms, embodiments of the invention enable parts having much longer fibers than those made via SFM, as well as enabling parts in which such fibers are specifically aligned to achieve certain structural objectives (e.g., strength, stiffness, etc.) Existing SFM processes do not place any fiber-precursor material into the mold cavity prior to injection, since, among any other reasons, one of the recognized and touted advantages of existing SFM processes are the rapid cycle times enabled by the injection process.

Furthermore, in accordance with the invention, the assemblage(s) of preforms are not simply overmolded, but, rather, since the resin in the assemblage(s) is melted by virtue of convective heat transfer from the injected melt flow or via conduction through heated mold walls, a coherent matrix is produced in the part. That is, to the extent that different regions of the part have different compositions, such regions are linked by a polymer matrix that is continuous throughout the part.

FIG. 1 depicts a process schematic of an illustrative embodiment of the invention and FIG. 5 depicts a flow diagram of method 500 in accordance with the illustrative embodiment. With reference to FIG. 1, in the illustrative embodiment, the method is carried out using injection mold 100 having mold cavity 120, auger screw 104, and foaming agent diffuser 110. In accordance with method 500 of FIG. 5, in operation S501, and as depicted in FIG. 8, assemblage 118 of fiber-bundle-based preforms is placed in injection mold 100, and in operation S502, a foam/melt flow mix is introduced into the mold cavity.

Figure 8:
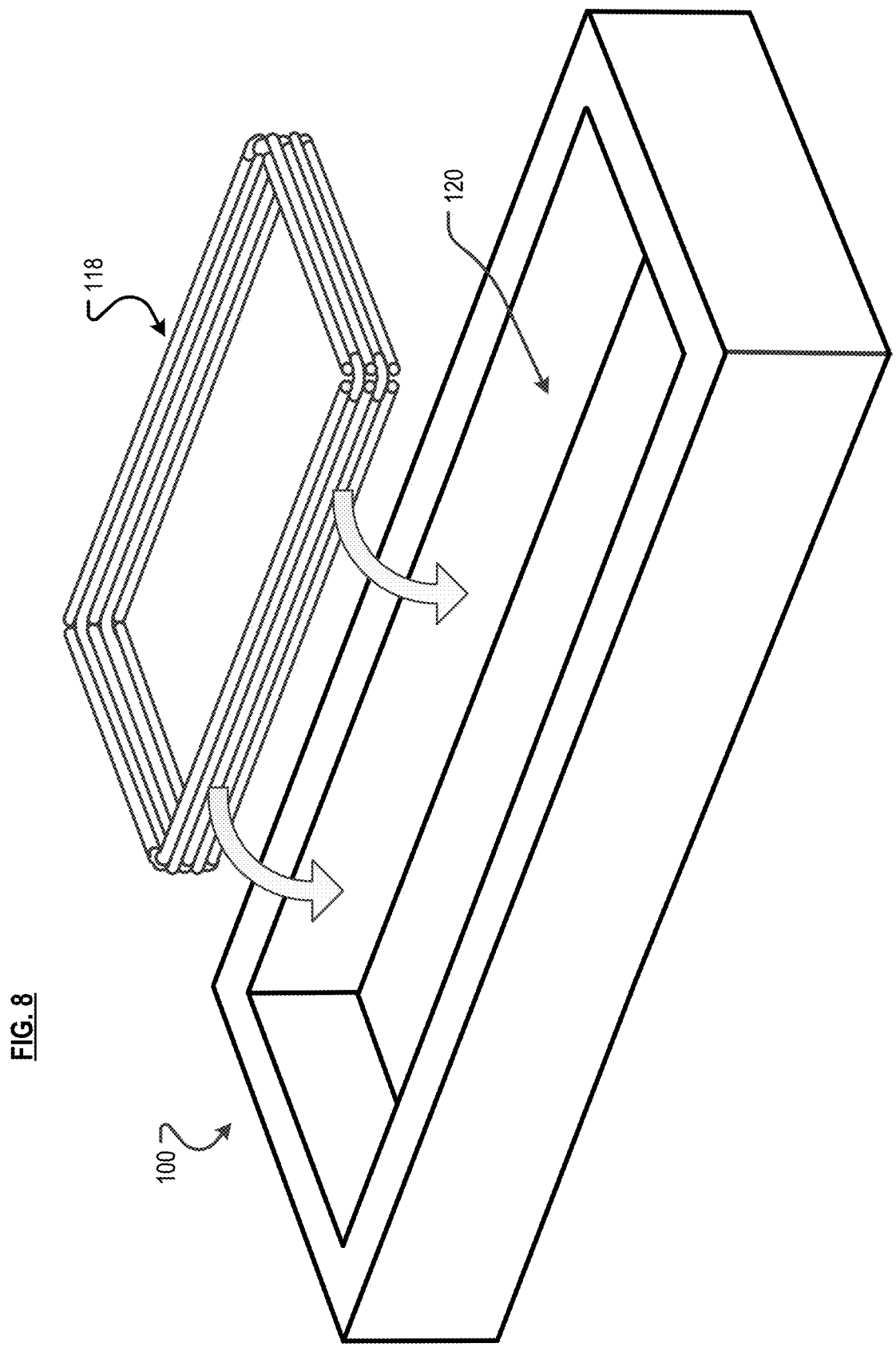
FIG. 8 depicts placing an assemblage of preforms in a mold cavity, in accordance with the present teachings.

The embodiment depicted here is distinguished from the prior art by the placement of assemblage of preforms 118 within injection mold 100, such as depicted in FIG. 8. In the illustrative embodiment depicted in FIG. 1, assemblage 118 is registered within, and held in position within mold 100, by walls 102A, 104A, 104B, and 105B of mold cavity 120 (walls 101 are the outer walls of mold 100).

Figure 2:
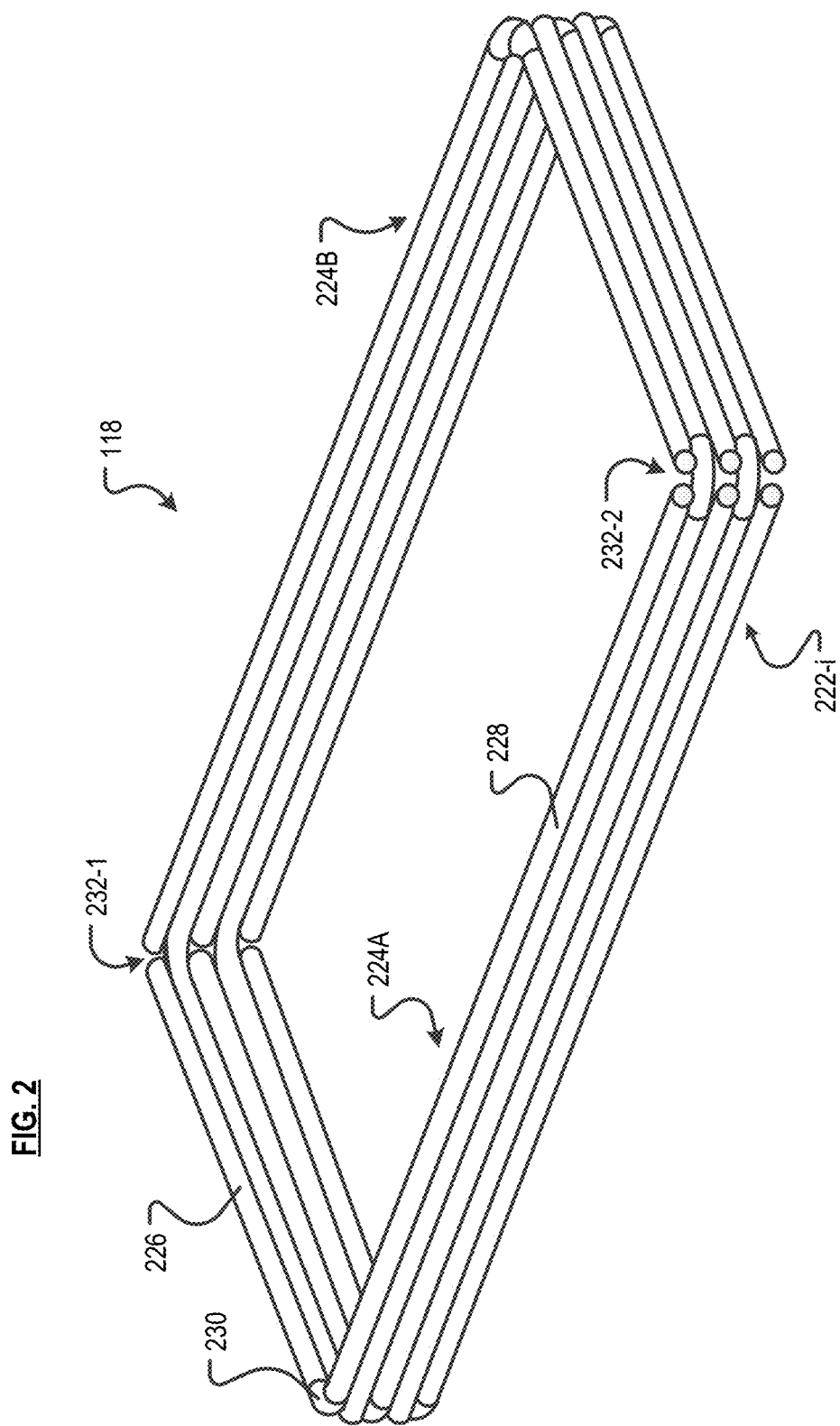
FIG. 2 depicts a preform charge designed to incorporate continuous and aligned fibers into the side-wall surfaces of the final part.

As described in further detail in conjunction with FIG. 2, the long, cylindrical bodies shown in assemblage 118 represent individual "preforms" that compose the assemblage. Fibers within each preform are continuous and unidirectional, aligning with the major axis of their host preform. Moreover, in the illustrative embodiment, within multilayer assemblage 118, the preforms in any layer are aligned in parallel with those in the overlaying or underlaying layers.

Mold cavity 120 is defined by end walls 102A and 102B, sides walls 104A and 104B, top wall 105A, and bottom wall 105B. By virtue of the positioning of assemblage 118 against some of the walls of cavity 120 (i.e., end wall 102A, side walls 104A and 104B, bottom wall 105B) of injection mold 100, the unidirectional continuous fibers will align with, and substantially define, one of the end walls and major portions of the side walls of the finished part. In this embodiment, the side of assemblage 118 nearest cavity wall 102B does not abut that cavity wall.

Composite feed 112 is fed to auger screw 104 through raw material hopper 106. Composite feed 112 is a slurry of loose fiber and resin, or resin only, as in the prior art. (Although a resin-only feed is not, strictly speaking, a "composite" feed, that term is used herein for convenience to refer to both fiber/resin feeds and neat resin feeds.)

The fibers in composite feed 112 are typically very short compared to the continuous fibers in assemblage 118. In any case, the fibers exiting auger screw 104 will necessarily be short (c.a., <25 mm) due to the shearing action thereof. Such fibers will not have any particular alignment in the final part, nor will they be "continuous," because they will be much smaller than any feature of the part in which they reside. The chemical composition of the fibers in composite feed 112 can be the same as or different than that of the fibers in assemblage 118. In the illustrative embodiment, the resin in composite feed 112 is chosen to be the same as, or at least compatible with, the resin used in assemblage 118, thereby facilitating bonding between the two resins within the cavity. The temperature and pressure of composite feed 112, after forming a melt flow via the action of auger screw 104, is specified so that it adequately melts, bonds, and permeates through assemblage 118.

Foaming agent 114, which can be liquid or gas, is introduced, through foaming-agent feed nozzle 108, into the composite feed 112, now in its melt phase. In the illustrative embodiment, this occurs directly downstream of auger screw 104. In some other embodiments, the foaming agent is introduced into auger screw 104. The foaming agent is further mixed with the melt flow in foaming-agent diffuser 110.

Foaming-agent-containing melt flow 116 is passed through nozzle 115 into region 119 of cavity 120 bounded by assemblage 118. As the melt flow 116 exits the nozzle, the pressure-drop across nozzle 115 triggers a rapid expansion of the foaming agent, which will involve a phase change to a gaseous state if the foaming agent is in liquid form. If provided in gaseous form, the foaming agent will simply expand.

As the foamed melt flow reaches any surfaces/structures within mold cavity 120, such as the preforms in assemblage 118, top wall 105A, or bottom wall 105B of the cavity, the surface tension of the gaseous pockets/bubbles is broken on contact. In the case of contact with the preforms, the polymer chains in melt flow 116 begin to physically entangle with the polymer chains in the resin from the preforms of assemblage 118. More particularly, the disruption of surface tension occurring via contact with the preforms de-foams the melt flow, and enables it to thoroughly permeate the structure of the assemblage. To insure that the resin in assemblage 118 melts (such that the association between melt flow 116 and assemblage 118 is not simply one of overmolding), melt flow 116 is injected into the mold cavity at a temperature that is high enough to melt the resin of the assemblage via convective heat transfer, as the melt flow permeates through the assemblage. This co-melting results in a "coherent" matrix throughout the part once cooled and removed from the mold. In other words, in any regions in the mold in which the two resins are in contact with one another, the resins (whether identical or merely "compatible,") will co-melt such that the matrix being formed in such regions is as robust as other regions of the part where the matrix is formed from a single resin (i.e., the resin from melt flow 116). The location of nozzle 115 (i.e., the center of the assemblage) was selected to facilitate even filling of material into assemblage 118.

FIG. 2 depicts further detail of assemblage 118 of preforms. Assemblage 118 can be implemented either as (1) a "preform charge," or (2) a layup of loose preforms.

A preform charge comprises one or more fiber-bundle-based preforms that are tacked together. The preform charge, which is typically a three-dimensional arrangement of preforms, is usually created in a fixture separate from the mold, and which is dedicated and specifically designed for that purpose. To create a preform charge, one or more preforms are placed (either automatically or by hand) in a preform-charge fixture. By virtue of the configuration of the fixture, the preforms are organized into a specific geometry and then tacked together. The preform charge is not fully consolidated; however, once the preforms are joined, they will not move, thereby maintaining the desired geometry and the specific alignment of each preform in the assemblage. The shape of the preform charge usually mirrors that of an intended part, or a portion of it. See, e.g., Publ. Pat. App. US2020/0114596 and U.S. patent application Ser. No. 16/877,236, incorporated herein by reference.

As indicated, as an alternative to using a preform charge, a layup (having the same configuration as the preform charge) of one or more individual preforms is created in the mold cavity. However, for both process efficiency as well a substantially greater likelihood that the desired preform alignment is maintained, the use of a preform charge is preferred. As used in this disclosure and the appended claims, the term "assemblage of preforms" means both a preform charge and a layup of preforms, unless otherwise indicated.

Turning now to the specifics of assemblage 118, which in the illustrative embodiment is a preform charge, the assemblage includes five layers or loops 222-$i$ of preforms stacked one upon the other. Each loop 222-$i$ contains two individual preforms: preform 224A and preform 224B. Each of the preforms are "L-shaped" and identical to one another, having short arm 226, long arm 228, and bend 230 therebetween. In the illustrative embodiment, the bend is a ninety-degree bend.

The preforms are formed using a sizing/bending machine. The formation of a preform involves appropriately bending towpreg, or some other source of a plurality of unidirectionally aligned resin-impregnated fibers, typically via a robot or other appropriate mechanism, then cutting the bent portion of the fiber bundle to a desired length. As appropriate, the order of the bending and cutting can be reversed.

In the illustrative embodiment, each loop 222-$i$ has two gaps: 232-1 and 232-2, which are the spaces between the two ends of the two preforms 224A and 224B. The discontinuities (i.e., the gaps) in each layer should be staggered, so that for each successive layer in assemblage 118, the gaps are offset. In other words, consider a loop 222-$i$ of assemblage 118 wherein gap 232-1 is positioned at "corner 1" and gap 232-2 is positioned at "corner 3" of the loop. The gaps in the underlying and overlying layers should then be positioned at "corner 2" and "corner 4." This enhances the strength of assemblage 118 as well as the molded part. Thus, at any given "corner," gaps and bends will alternate for successive layers.

In some other embodiments, the loops can be configured differently than described above. For example, the loop can be configured as one rectangular shaped preform with a break where the preform begins and ends, or two "U" shaped preforms, or straight preforms combined with "L" or "U" shaped preforms, etc. In some embodiments, more than two preforms are used to form the layer. For optimal strength and stiffness, the number of preforms should be minimized and breaks between preforms where one preform ends and the other starts should be staggered from layer to layer (as shown in FIG. 2). Also, the structure of the loop can vary from layer to layer.

In the context of a perform charge (as opposed to a layup of preforms), after the various loops 222-$i$ are stacked, the preforms are advantageously tacked/joined together. This can be performed by heating them and then pressing them together. Other techniques for tacking/joining include ultrasonic welding, friction welding, lasers, heat lamps, chemical adhesives, and mechanical methods such as lashing.

Each fiber-bundle-based preform in assemblage 118 includes many individual, unidirectionally aligned fibers, typically in multiples of a thousand (e.g., 1 k, 10 k, 24 k, etc.). As previously indicated, these fibers are typically sourced from a spool of towpreg. That is, the preforms are segments of towpreg, cut to a desired length and shaped, as appropriate for the application. As known to those skilled in the art, in towpreg, the fibers are impregnated with a polymer resin. In some other embodiments, the bundle of fibers can be sourced directly from impregnation processes, as known to those skilled in the art. Whatever the source, the fiber bundles, and hence the preforms, can have any suitable cross-section, such as, without limitation, circular, oval, trilobal, and polygonal. As used herein, the term "preform" means "fiber-bundle-based preform," as described above, unless otherwise indicated.

In some embodiments, each preform in an assemblage of preforms has the same composition as all other preforms (i.e., the same fiber type, fiber fraction, and resin type). However, in some other embodiments, some of the preforms can differ from one another. For example, there may be instances in which different properties are desired at different regions within a complex part. Furthermore, if more than one assemblage of preforms is present in the mold cavity, the preforms in one assemblage can be the same or different than those in other assemblages in the cavity.

It is preferable, but not necessary, for all preforms to include the same resin. But to the extent different resins are used in different preforms or different assemblages, they must be "compatible," which means that they will bond to one another. A preform assemblage can also include inserts that are not fiber based.

The individual fibers in a preform can have any diameter, which is typically, but not necessarily, in a range of 1 to 100 microns. Individual fibers can include an exterior coating such as, without limitation, sizing, to facilitate processing, adhesion of binder, minimize self-adhesion of fibers, or impart certain characteristics (e.g., electrical conductivity, etc.).

Each individual fiber can be formed of a single material or multiple materials (such as from the materials listed below), or can itself be a composite. For example, an individual fiber can comprise a core (of a first material) that is coated with a second material, such as an electrically conductive material, an electrically insulating material, a thermally conductive material, or a thermally insulating material.

In terms of composition, each individual fiber can be, for example and without limitation, carbon, glass, natural fibers, aramid, boron, metal, ceramic, polymer filaments, and others. Non-limiting examples of metal fibers include steel, titanium, tungsten, aluminum, gold, silver, alloys of any of the foregoing, and shape-memory alloys. "Ceramic" refers to all inorganic and non-metallic materials. Non-limiting examples of ceramic fiber include glass (e.g., S-glass, E-glass, AR-glass, etc.), quartz, metal oxide (e.g., alumina), aluminasilicate, calcium silicate, rock wool, boron nitride, silicon carbide, and combinations of any of the foregoing. Furthermore, carbon nanotubes can be used. Hybrid yarns consisting of dry fibers commingled with polymer filaments can also be used.

As previously mentioned, although the fibers associated with composite feed 112 and those associated with assemblage of preforms 118 may be the same, they may also be different. For example, in some embodiments, chopped glass fibers within PA6 resin (as composite feed 112) are injected into a preform assemblage having carbon fibers within PA6 resin.

Moreover, it is not required for the injected feed to contain fibers; it may be neat resin (to which the foaming agent is then added). The presence of chopped fibers within the injected material provides some mechanical benefits to the porous core, but has a negligible effect on the SFM process. By definition, preforms in assemblage(s) 118 are required to contain long, continuous, and aligned fibers of any type.

Suitable resins for use in conjunction with the embodiments of the invention include any thermoplastic, thermoset, or metal matrix that bonds to itself under heat and/or pressure, although in most embodiments, a thermoplastic is used.

Any thermoplastic polymer can be used in conjunction with embodiments of the invention, as long as suitable processing conditions are met (e.g., injection temperature and pressure). As previously mentioned, the thermoplastic used for injection (such as in composite feed 112) and the thermoplastic used in the assemblage of preforms must be compatible with one another, and more preferably are the same polymer. In addition to achieving proper melt-flow viscosity, temperature can also be used to facilitate co-melting of the preforms in the assemblage, either by heating both the mold and melt or by overheating the melt within the functional range of the polymer. Provided there is adequate heat transfer to the assemblage(s) of preforms, the resin therein will co-melt with the melt flow to create a coherent matrix in the finished part.

Exemplary thermoplastic resins useful in conjunction with embodiments of the invention include, without limitation, acrylonitrile butadiene styrene (ABS), nylon, polyaryletherketones (PAEK), polybutylene terephthalate (PBT), polycarbonates (PC), and polycarbonate-ABS (PC-ABS), polyetheretherketone (PEEK), polyetherimide (PEI), polyether sulfones (PES), polyethylene (PE), polyethylene terephthalate (PET), polyphenylene sulfide (PPS), polyphenylsulfone (PPSU), polyphosphoric acid (PPA), polypropylene (PP), polysulfone (PSU), polyurethane (PU), polyvinyl chloride (PVC). An exemplary thermoset is epoxy.

Suitable foaming agents include nitrogen, carbon dioxide, as well as other commercially available chemical foaming agents (CFAs) or chemical blowing agents (CBAs). Nitrogen provides the same result as the commercial foaming agents at less cost, so it is generally preferable for SFM processes. The foaming agent can be in liquid form or gaseous form. Regardless of the type of agent used, in accordance with the illustrative embodiment, the agent is diffused into the melt flow of composite feed 112. The foaming agent will rapidly expand (with phase change when provided in a liquid state) upon exiting the injection nozzle, and its bubbles will collapse on contact with either preform charges or the mold surface. The volume of foaming agent must be considered when specifying melt-flow volume, and can be tuned to control relative pore size.

Returning to a discussion of method 500, in FIG. 6 operation S501 involves (i) determining a desired fiber-alignment and fiber placement to satisfy the part requirement (operation S601), and (ii) forming an assemblage of preforms suitable for achieving the desired alignment and placement (operation S602).

In designing assemblages of preforms for placement in a structural-foam injection mold, considerations include, among others:
 (a) fiber alignment, which may be (i) along the surface of the part, (ii) within the part, or (iii) a combination of both to best suit loading conditions;
 (b) registration of the assemblage of preforms to the mold cavity, and
 (c) total volume of the assemblage of preforms, to specify the volume of the injected composite material.

With respect to item (a), for a relatively simple part, it is within the capabilities of those skilled in the art to determine a desired fiber alignment to satisfy part requirements based on anticipated loading conditions. That is, based on their experience, those skilled in the art will be able to estimate the anticipated principle stress vectors arising in an in-use part, and know where in the part the fibers should be positioned, and how they should be aligned, to provide the requisite part performance.

For more complicated scenarios, either as consequence of part geometry, the forces to which the part is subjected in use, or both, the anticipated principle stress vectors can be determined, for example, using the techniques disclosed in Pub. Pat. App. US2020/00130297, incorporated by reference herein. Briefly, that application discloses: (a) developing a description of the part's geometry, (b) developing a description of the part's anticipated loading conditions, and (c) performing a finite element analysis (FEA) on the part geometry to calculate the stress under load. This results in a three-dimensional principal stress contour map for the interior of the component. The referenced publication discloses that by considering the orthotropic material properties at hand, a preform "map" (i.e., a preform layout/arrangement) can be developed from the principal stress contour map, such as by using a technique that determines "low-cost" routing. See also, U.S. patent application Ser. No. 16/811,537.

Regarding step (c) above, for every point in a given part with a given load case, there exists a stress state with six stresses aligned with the x, y, z axes and the shear stresses between them. If one rotates that stress state such that the shear stresses go to zero, the result is three, mutually orthogonal principal stresses. Each principle stress has a magnitude (which can be zero) and a direction; hence "stress vector." The directions are orthogonal to one another. This stress tensor can rotate and change in magnitude from one element (in the finite element analysis) to the next.

A determination as to the nature of the fiber alignment in any particular region considers the principal stress tensors in that region. If the maximum or minimum principal stress is significantly larger than the other two, and follows a straight line or curves in a certain direction, fibers (in the part) can be aligned therewith, with few if any fibers being aligned in other directions ("off-axis" directions). If, on the other hand, a region has two or more principal stresses with substantially similar magnitudes, then, ideally, fibers should be aligned in multiple directions (i.e., the directions of the principal stresses) or randomized in an attempt to address the plural directions of such stresses.

Figure 7:
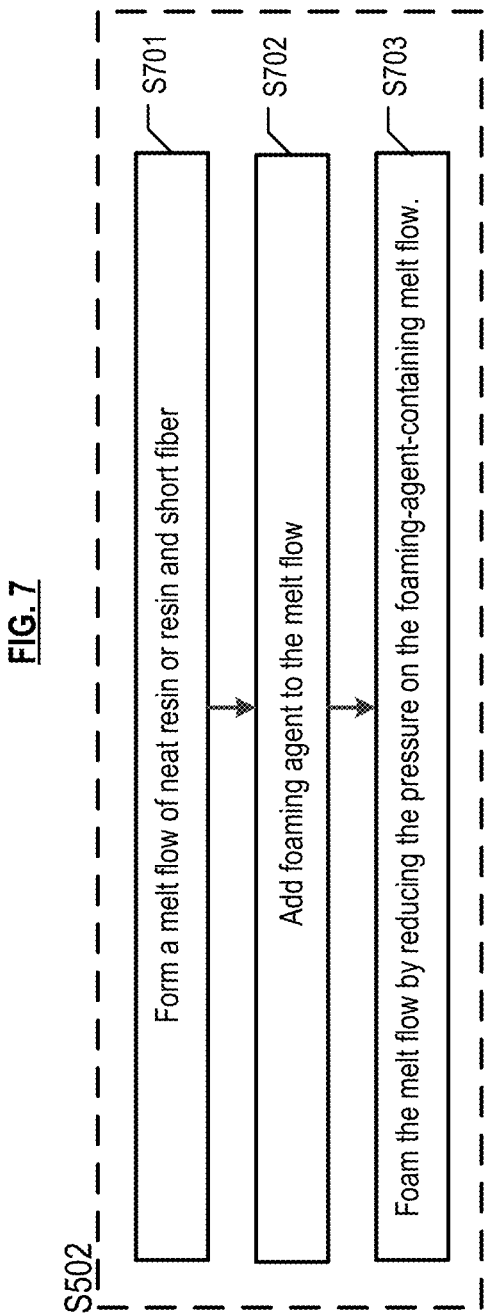
FIG. 7 depicts suboperations for performing one of the operations of the method of FIG. 5.

Returning once again to method 500, operation S502 can be implemented by the suboperations depicted in FIG. 7. In particular, introducing foaming agent/melt flow mix into the mold cavity includes suboperation S701, which requires forming a melt flow of neat resin or resin and short fiber. This can be implemented by feeding resin pellets, etc., and fiber to an auger screw, as depicted in FIG. 1. The auger screw heats the resin or resin and fiber until a melt flow is created, and also pressurizes the melt flow. Foaming agent is added creating a mixture of foaming agent in the melt flow of resin, or resin and fiber, in suboperation S702. In operation S703, the melt flow is foamed/expanded by exposing the foaming agent/melt flow mix to reduced pressure across the nozzle.

Organization and fiber alignment of the assemblage(s) of preforms within the cavity is preserved as the foamed melt flow fills the mold due to the low injection pressures necessary for SFM processes. The end result is a composite part possessing both the complexity and low-density benefits of an SFM part, but also the high strength and stiffness benefits of continuous and aligned-fiber composites.

The continuous and aligned fibers present in the final part can be organized as desired through purposeful design of the shape and placement of the assemblage(s) of preforms within the mold. If the continuous and aligned fibers are desired on the surface of a part, they can be situated in regions along the mold surface as needed. Alternatively, a continuous-fiber lattice structure can be created by situating preforms among internal volumetric regions. A combination of surface and internal fibers can also be designed into the assemblages of preform to link disparate regions.

Furthermore, in some embodiments, an assemblage of preforms is designed so that only a portion of its fibers remain in place, wherein a portion of the continuous fiber of the charge is flowed by the foamed melt flow. This is accomplished via strategic placement of tack points and exposed ends of individual preforms. Such an embodiment is analogous to the stem structure within a leaf—a central support with supplementary supports extending from it. Alternatively, the assemblage of preforms can include those having "partial cuts" at one or more specific locations. A partial cut extends part of the way, but not all of the way, through the transverse cross section of a preform at one or more specific locations along the length thereof. As a result of such one or more partial cuts, some fibers in the preform are reduced in length relative to uncut fibers, the latter being equal to the length of the preform. Preforms are partially cut at locations that, when the preforms are positioned in a lay-up within a mold, are proximal to features into which the cut fibers are intended to flow.

Regardless of the specified placement of the assemblage(s) of preform, the remaining volume of the final part will be filled with structural foam that maintains the orientation of, bonds to, and supports the continuous fibers in the final part.

The assemblage of preforms placed within the mold can resemble any number of geometric embodiments, as specified by the upstream forming and tacking processes. The orientation and net volume of assemblage of preforms is determined by the final part requirements, which, in turn, determines the volume of the injected material, so as to properly match cavity volume.

Placement of the assemblage(s) of preforms within the mold can manifest in multiple unique embodiments. Depending on the requirements of the final part, assemblages of preforms, and even individual preforms can be placed in surface volumetric regions of the mold cavity, in internal volumetric regions of the mold cavity, or a combination of both.

For parts requiring continuous and aligned fibers in surface volumetric regions, preforms or assemblage(s) of preforms are shaped per the mold-surface contours and can be situated and registered against the mold surface. Alternatively, for parts requiring continuous and aligned fibers within internal volumetric regions, preforms or assemblage(s) of preforms are placed in the corresponding internal region of the mold cavity, and can be situated and registered by virtue of their structure and features of the mold.

In an alternative embodiment requiring continuous fibers in internal regions, assemblages of preforms, or portions thereof, or individual preforms can be designed to be carried by the incoming melt flow, thereby producing fiber-alignment patterns that are dictated by the fluid dynamics of the melt flow. Internal fiber patterns in the finished part produced by such embodiments are, as previously noted, analogous to the stem structure within a leaf, exhibiting multiple flowed fibers branching from a non-flowed, central support. To facilitate alignment of both flowed and non-flowed preforms and/or assemblages within internal regions, computational fluid dynamics (CFD) can be utilized to model and optimize melt-flow behavior around the preforms or assemblages thereof.

The illustrative embodiment is an enhancement of SFM processes. In some other embodiments, a CIM process is enhanced/modified in accordance with the present teachings. Whether compared to an existing SFM process or an existing CIM process, the enhancement resulting from embodiments of the invention is a consequence of, at least in part, placing one or more assemblages of fiber-bundle-based preforms in the injection mold cavity. It is notable that the present teachings are preferably applied to SFM processes due to the lower injection pressures associated therewith, relative to CIM. The high pressures involved with CIM risk unwanted displacement of the preforms/assemblages during the filling of the mold cavity.

Figure 3:
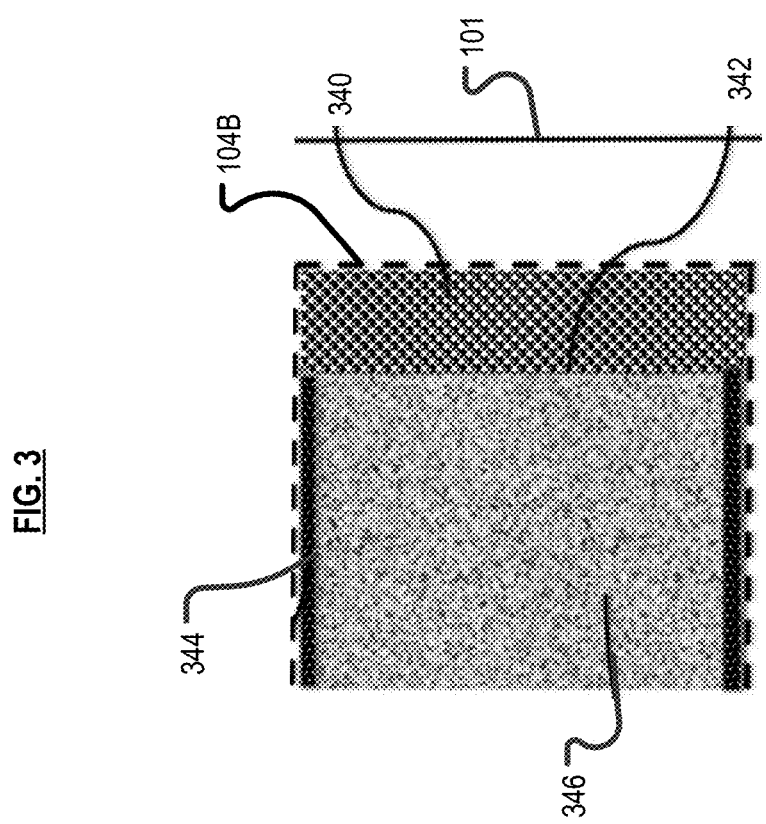
FIG. 3 depicts a section view of the mold cavity after it is volumetrically filed with foam.

FIG. 3 depicts a partial sectional view along the line A-A in the direction shown in FIG. 2, but after mold 100 has been filled with the injected material (foamed melt flow), and all constituent materials are shown consolidated into their final orientations. (Only half of the full sectional view is shown, since the other half is the mirror image of what is depicted.)

FIG. 3 depicts the four types of regions occupying the full mold cavity. On the far-right side of the cavity, continuous and aligned fiber region 340, wherein the fibers have their major axis oriented into/out of the page, are arranged against the mold surface as a result of the initial placement of assemblage 118. In the central, internal-core region of the mold cavity towards the left of FIG. 3, the injected material (foamed melt flow) has formed into porous structural foam 346. Skin layer 344 has formed above and below porous structural foam 346 as a result of the surface tension of foaming-agent bubbles breaking on contact with the mold surface. The skin layer is thus solid composite (matrix and fiber, or matrix only); that is, melt flow 116 sans foam. It is typically about 0.25" thick. Thus, the matrix of skin layer 344 is sourced or "associated with" the resin from composite feed 112.

Interfacial co-melting region(s) 342 are created between the porous structural foam 346 and aligned and continuous fiber region 340, and also between skin layer 344 and aligned and continuous fiber region 340. The significance of these regions is that in such regions, the matrix is sourced from two resins: the resin in composite feed 112 and the resin in assemblage 118 of preforms.

Regions 342 is formed via heat transfer applied to assemblage 118 convectively by the melt flow and/or conductively by the mold surface. Once the resin in assemblage 118 reaches its melt phase via the applied heat transfer, the polymer chains therein physically intermingle with like polymer chains of the melt flow (i.e., from composite feed 112). A "coherent polymer matrix" is thus formed, such that there are no discontinuities in the polymer matrix, even though the composition of the part varies in the various regions (i.e., skin layer 344, porous structural foam 346, and aligned continuous fiber region 340). In this manner, the various compositionally disparate regions are linked to one another. In view of the permeability of assemblage 118, some melt flow will co-melt with preforms that were situated such that they would be in the "middle" of fiber region 340. Consequently, interfacial co-melting regions 342 is typically not a distinct interface as depicted in FIG. 3; rather, it is dispersed, appearing throughout the part in any locations in which the two resins intermingle with one another.

The coherent polymer matrix also includes co-melting that occurs between the resin in skin layer 344 and the resin sourced from assemblage 118 of preforms.

Figure 4:
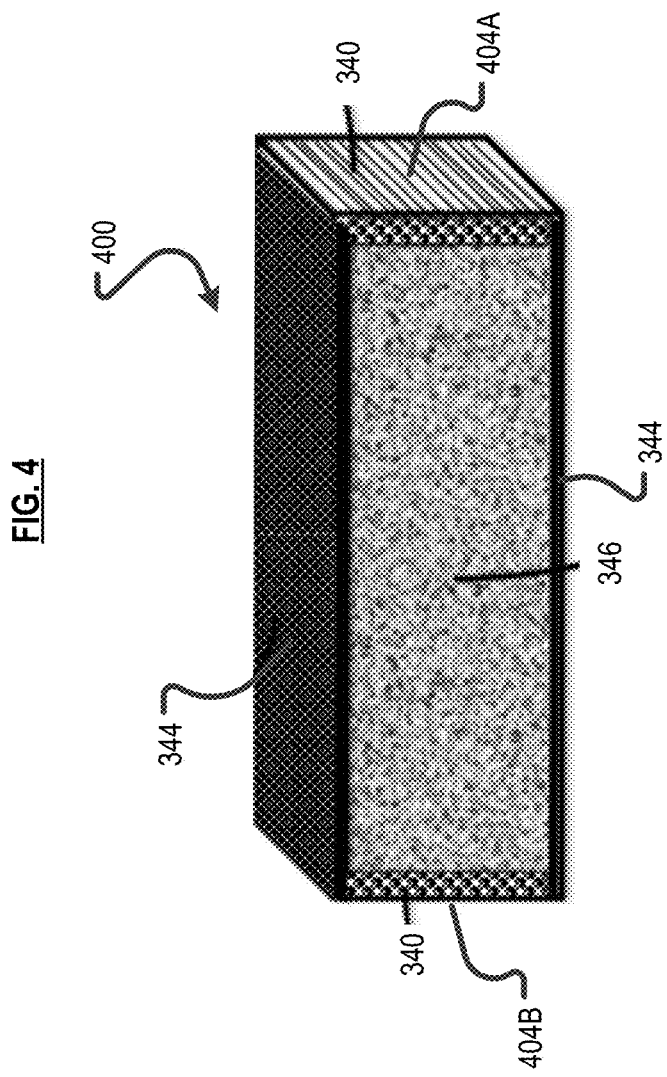
FIG. 4 depicts a sectional view of a finished part.

FIG. 4 depicts a sectional view of finished part 400. In this embodiment, the location of the continuous and aligned fibers sourced from assemblage 118 results from the specific initial placement of the assemblage in mold 100.

Continuous and aligned fiber region 340 forms at least a portion of side walls 404A and 404B of part 400. For the end walls (not depicted), the fibers in the continuous and aligned fiber region 340 are positioned such that they would be oriented horizontally (left-to-right in FIG. 4). For assemblage 118 comprising L-shaped preforms as depicted in FIG. 2, the fibers are continuous along one side wall (for example, side wall 404A) and one end wall. Other fibers are continuous along a second sidewall (for example, side wall 404B) and a second end wall. Skin layers 344 are disposed on the "top" and "bottom" of part 400. Porous structural foam 346 is disposed within the volume defined by skin layers 344, side walls 404A and 404B, and the end walls (not depicted).

It is to be understood that the disclosure describes a few embodiments and that many variations of the invention can easily be devised by those skilled in the art after reading this disclosure and that the scope of the present invention is to be determined by the following claims.

What is claimed:

1. A method for forming a fiber-composite part, comprising:
    determining, based on expected load conditions and part requirements, a desired fiber-alignment and positioning of fibers within the fiber-composite part;
    forming an assemblage comprising a plurality of fiber-bundle-based preforms, wherein the plurality of fiber-bundle-based preforms are arranged to achieve the desired fiber-alignment and positioning of fibers when the assemblage is placed in a mold cavity;
    placing the assemblage of the plurality of fiber-bundle-based preforms in the mold cavity;
    forming a melt flow, wherein the melt flow includes:
    a) melted first resin and loose fiber, or
    b) melted first resin without fiber;
    forming a mixture by adding a foaming agent to the melt flow; and
    delivering the mixture of melt flow and foaming agent to the mold cavity, wherein pressure is lower in the mold cavity than under conditions in which the foaming agent is added to the melt flow, thereby causing the foaming agent to foam in the melt flow.

2. The method of claim 1, wherein the assemblage is a preform charge.

3. The method of claim 1, wherein forming the melt flow comprises adding the first resin, or fiber and the first resin to an auger screw that heats the first resin until the first resin melts.

4. The method of claim 1, wherein delivering the mixture to the mold cavity comprises delivering the melt flow and foaming agent to a region defined within the assemblage of the plurality of fiber-bundle-based preforms.

5. The method of claim 2, wherein placing the assemblage comprises registering the preform charge with a feature of the mold cavity.

6. The method of claim 1, comprising flowing a portion of the assemblage to an internal location in the mold cavity via the melt flow, such that alignment and positioning of some fibers in the fiber-composite part is dictated, at least in part, by fluid dynamics of the melt flow.

7. The method of claim 1, wherein placing the assemblage comprises positioning a portion of the assemblage proximal to a surface region of the mold cavity.

8. The method of claim 7, wherein the assemblage has a shape that conforms to contours of walls of the mold cavity.

9. The method of claim 1, wherein the melt flow includes the melted first resin and the loose fiber.

10. The method of claim 1, wherein the plurality of fiber-bundle-based preforms in the assemblage comprise second resin, and wherein delivering the mixture of melt flow and foaming agent to the mold cavity comprises melting a portion of the second resin in at least some of the plurality of fiber-bundle-based preforms.

11. The method of claim 10, comprising physically intermingling a portion of the first resin from the melt flow and the portion of the second resin to form a coherent polymer matrix in the fiber-composite part.

12. The method of claim 10, comprising forming four regions in the fiber-composite part, including:
    (i) aligned and continuous fiber region formed from the assemblage of plurality of fiber-bundle-based preforms;
    (ii) porous structural foam region formed as the foaming agent foams in the melt flow;
    (iii) skin layer formed proximal to the porous structural foam region; and
    (iv) interfacial co-melting regions comprising the first resin and the second resin, wherein the interfacial co-melting regions are formed between (a) the aligned and continuous fiber region and the porous structural foam region, and (b) the skin layer and the aligned and continuous fiber region.

13. The method of claim 1, wherein placing an assemblage of the plurality of fiber-bundle-based preforms comprises structuring the assemblage so that some, but not all of a plurality of fibers in the fiber-bundle-based preforms remain at a location at which the plurality of fiber-bundle-based preforms were placed in the mold cavity, the fibers not remaining at the location flowing with the melt flow.

14. The method of claim 13, wherein structuring the assemblage comprises forming cuts partially through some of the plurality of fiber-bundle-based preforms in the assemblage at one or more specific locations.

15. The method of claim 14, wherein the plurality of fiber-bundle-based preforms having the cuts are situated in the mold cavity proximal to features in which fibers released from the plurality of fiber-bundle-based preforms are intended to flow.

16. A method for forming a fiber-composite part, comprising:
    placing an assemblage of fiber-bundle-based preforms in a mold cavity, each fiber-bundle-based preform comprising a plurality of co-aligned fibers impregnated with a first thermoplastic resin;
    forming a melt flow, wherein the melt flow includes:
    a) melted second thermoplastic resin and loose fiber having a length that is less than about 25 millimeters, or
    b) melted second thermoplastic resin without fiber;
    forming a mixture by adding a foaming agent to the melt flow;
    delivering the mixture of melt flow and foaming agent to the mold cavity, wherein pressure is lower in the mold cavity than under the conditions in which the foaming agent is added to the melt flow, thereby causing the foaming agent to foam in the melt flow;

melting at least some of the first thermoplastic resin, wherein a portion of the melted first thermoplastic resin and a portion of the melted second thermoplastic resin intermingle to form a coherent polymer matrix, linking compositionally disparate regions of the fiber-composite part to one another.

17. The method of claim 16, wherein the melt flow includes the melted second thermoplastic resin and the loose fiber.

* * * * *